July 4, 1944.　　　W. M. PARKER　　　2,352,913
INSULATED OUTLET RECEPTACLE AND JUNCTION BOX AND UNITS
Filed March 7, 1938　　　2 Sheets-Sheet 1
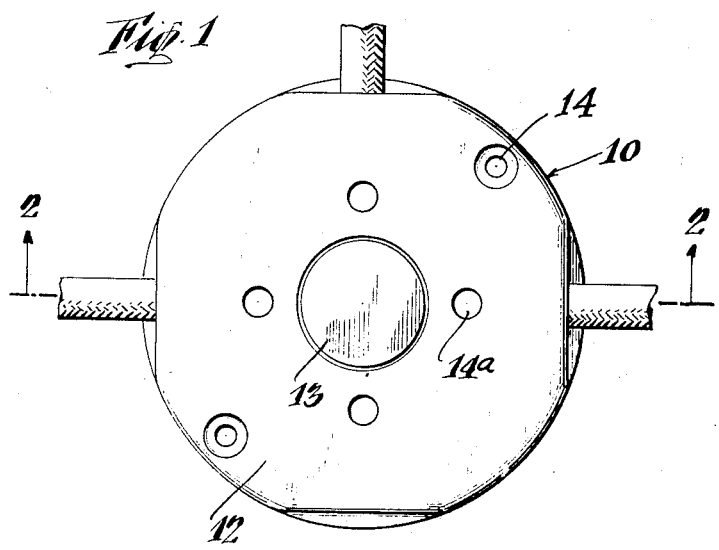
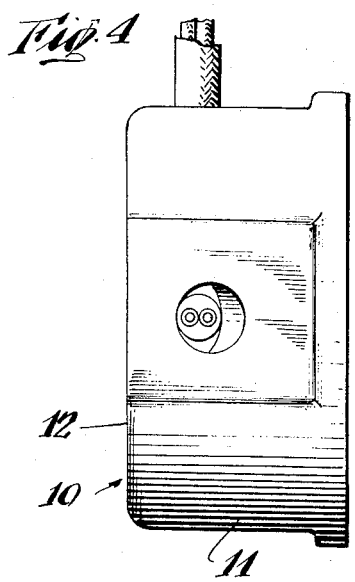
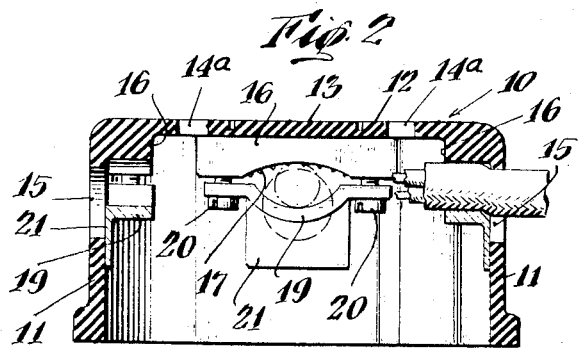
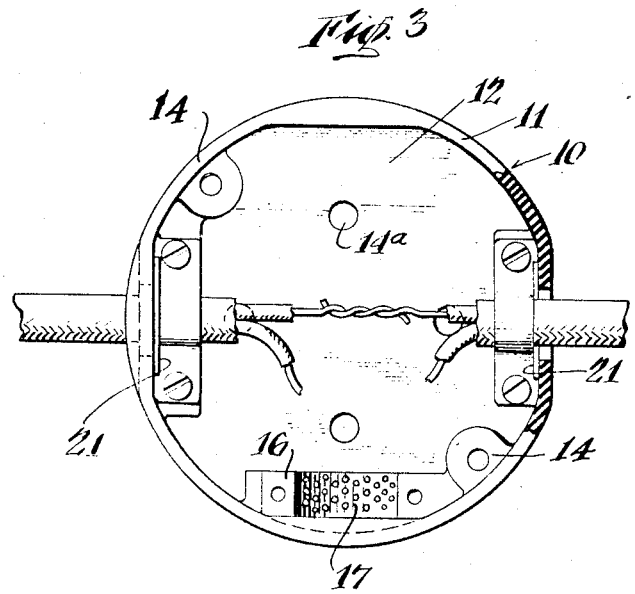
INVENTOR
William Morrill Parker
BY James J. Cannon
ATTORNEY July 4, 1944. W. M. PARKER 2,352,913
INSULATED OUTLET RECEPTACLE AND JUNCTION BOX AND UNITS
Filed March 7, 1938 2 Sheets-Sheet 2
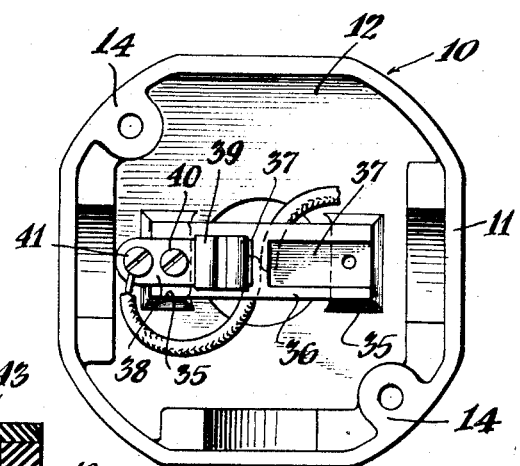
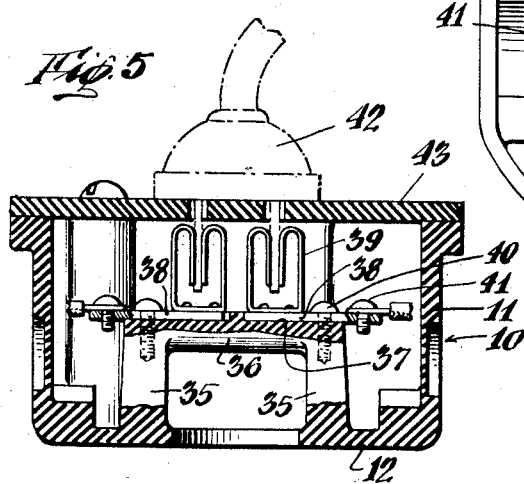
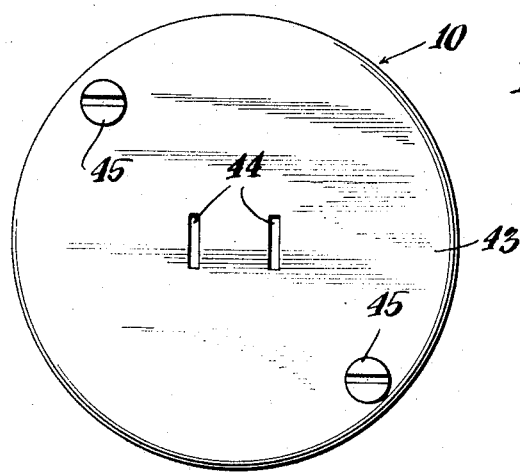
INVENTOR
William Morrill Parker
BY James J. Cannon
ATTORNEY Patented July 4, 1944

2,352,913

UNITED STATES PATENT OFFICE 2,352,913

INSULATED OUTLET RECEPTACLE AND JUNCTION BOX AND UNITS

William Morrill Parker, Parkersburg, W. Va.

Application March 7, 1938, Serial No. 194,327

2 Claims. (Cl. 174—52)

My invention relates to improvements in a combination outlet receptacle and junction box and units which is completely insulated. The objects of my invention are first, to provide a completely insulated outlet, receptacle and junction box and units as an aid to accomplishing a completely insulated cable system; second, to eliminate the necessity of a separate outlet and junction box and separate units; third, to lessen costs, and fourth, to provide a box which will resist corrosion from moisture or corrosive fumes. Also a box which may be ventilated or sealed so that it is air tight, as the occasion requires. With such combination box and units, short circuits and fire hazards are entirely eliminated, costs reduced and corrosion eliminated.

One form of my invention is illustrated in the accompanying drawings in which Figure 1 is a plan view. Figure 2 is a cross section through Figure 1 on line 2—2; Figure 3 is an inverted plan view; Figure 4 is an end elevation; Figure 5 is a cross section of device when used as a receptacle for an electric plug; Figure 6 is a plan view of Figure 5; Figure 7 is an inverted view of Figure 5 with cover plate removed and with one contact omitted.

Reading on Figures 1, 2, 5, 6, and 7 of my device, it consists of a cap 10, sidewalls 11, portion 12, knockout section 13, fastening holes 14, lead in holes 15, bridge member 16, contact section 17, clamping member 19, clamping screws 20, skirt for clamping member 21.

Reading on Figures 5, 6, and 7, we have two posts 35, connecting bridge 36, groove 37, contact plate 38, contact 39, fastening screws 40, terminal posts 41, plug 42, cover plate 43, slots for prongs 44, fastening screws 45.

A cable is placed in the box and it is held in place by the clamping member 19 through which the cable passes. As the clamping screws 20 are tightened bridge 16 tightens and firmly grips the cable.

The bridge member 16 is a permanent part of the box and not an assembled fitting, as can be seen in Figure 3. The box may be used for one or more cables which may be connected to form one or more circuits or an outlet or one or more receptacles, if desired. When the box is used as a receptacle posts 35 and connecting bridge 36 are permanently fixed in the said box.

My device may be made principally out of a non-conductive and non-ceramic moulding compound such as, for example, Bakelite, or any other such non-conductive moulding compound. My object in using a non-conductive moulding compound in making the box and unit is to have, as already stated, a nonconductive box and unit, and thus eliminate the use of the old metal box which not only corrodes from moisture and corrosive fumes, but which, in many cases, may act as a conductor and thus may cause short circuits and may cause fires. Furthermore, I provide a box which may be ventilated or sealed as the occasion may require.

Another object of my device is to cut costs by eliminating the separate unit and constructing the box and unit, as one, as already stated. While my box may be used solely as a junction box, it is also available for use as an outlet box in which a bulb may be installed without any further attachment or it may be made up to act as a junction box and contain at the same time one or more receptacles. It may, however, be used completely as an outlet box, if desired.

The only part of my device which might be advisable to make of iron and steel are the clamping members 19 and skirt 21 also the clamping screws 20 and mounting screw 25 which in no way affects the objects of this my invention. However, other materials and means may be used to effect said purpose within the scope of the claims. Instead of using metal for clamping members 19, and for skirt for clamping members 21, any rigid material may be used. Instead of using clamping screws 20, 20, and mounting screws 25, other methods of fastening may be used within the scope of the claims. Instead of using a concave section, as shown at 17, a convex, or other form may be used within the scope of the claims.

My device may have other uses other than those shown in Figures 3 and 5, which show its application as a junction box, lamp socket or as a receptacle.

In the form of the invention shown the bridge members are provided with a clamp engaging shoulder on each side of the depressed cable engaging surface. The clamp engaging surfaces of the shoulders are in a plane or planes normal to the axis of the box. The curve or arc on which the surfaces 17 of the depressed cable rests are struck is shown in the drawings geometrically to be an ellipse or ellipsoidal. This arc 17 connects the adjacent shoulders of the same bridge member 16 and never substends an angle of more than 180°; otherwise stated the length of the arc is not allowed to extend beyond a semi-circle, in order to avoid the presentation of undercut pockets or ledges. The said surfaces of the shoulders of the bridge members 16 are also at substantially right angles to the interior surface of the box side wall 11. Cooperating to produce this relationship of angularity the cable-receiving knock-out apertures 15 are produced in the side wall with axes which intersect the axial line of the box at approximately right angles. The bridge members 16 are in the back wall sides of the apertures 15 with the depressed cable rests 17 adjacent the apertures 15 in a relation to receive the cables entering through the apertures 15.

The inner side walls and end walls of the bridge members 16 have preferably straight surfaces which are substantially parallel to the axis of box.

It will be appreciated that the precise angularity illustrated and herein defined of 90° constitutes a preferred form but that any variations thereof are within the purview of the invention which do not involve the formation of undercut pockets. The construction is such as to be free of undercut pockets referred to the open end of the box.

The drawings show that the box has no undercut portions in the interior thereof, the advantages of which are well known in the molding art.

While I have illustrated my invention in one form only and as made of specific materials, I do not intend to limit myself to that particular design, method or materials, as it is apparent that other designs, methods, and materials may be employed for obtaining the same results within the scope of my claims without departing from the scope or spirit of my invention.

I claim:

1. An electrical outlet box comprising a body-enclosing side wall open at its front and having a weakened portion forming a knock-out cable-receiving aperture therein with its axis intersecting the open end axis of the box at substantially a right angle, a back wall for closing the rear end of the box also having a weakened opening forming a knock-out cable receiving aperture therein, a bridge member having a depressed cable engaging surface adjacent said first mentioned knock-out aperture for receiving the cable entering through said aperture, said side and back walls and said bridge member all formed in one piece of non-conductive and non-ceramic molding material with said bridge member integral both with the back and side walls and existing as a reinforced mass at the corner or angle between said side and back walls, said bridge member having clamp-receiving shoulders at opposite ends of the depressed cable engaging surface, the surfaces of said shoulders being in a plane substantially normal to the axis of the open end of the box, said surfaces and depressed cable engaging surface all facing the open end of said box, the surfaces of said shoulders and cable engaging surface being also at substantially right angles to the inner surface of the side wall of the box, the inner side wall and end walls of said bridge member being substantially straight line surfaces substantially parallel with the axis of the open end of the box, said cable engaging surface struck on an arc not exceeding 180°, said arcuate cable engaging surface, said shoulders and all other interior surfaces of said box being free of undercut pockets with reference to the open end of the box, a clamp member having portions complemental to said shoulders and arcuate cable engaging surface, and fastenings on the shoulders for securing said clamp member to the shouldered portions of said bridge member.

2. An electrical outlet box comprising a body-enclosing side wall open at its front end and having weakened portions forming knock-out cable-receiving apertures therein with their axes intersecting the open end axis of the box at substantially right angles, a back wall for closing the rear end of the box, a bridge member for each of said apertures having a depressed cable engaging surface adjacent said knock-out apertures for receiving the cables entering through said apertures, said side and back walls and said bridge member all formed in one piece of non-conductive and non-ceramic molding material with said bridge member integral both with the back and side walls and existing as a reinforced mass at the corner or angle between said side and back walls, said bridge member having clamp-receiving shoulders at opposite ends of the depressed cable engaging surface, the surfaces of said shoulders being in a plane substantially normal to the axis of the open end of the box, said surfaces and depressed cable engaging surface all facing the open end of said box, the surfaces of said shoulders and cable engaging surface being also at substantially right angles to the inner surface of the side wall of the box, the inner side wall and end walls of said bridge member being substantially straight line surfaces substantially parallel with the axis of the open end of the box, a clamp member having portions complemental to said shoulders and cable engaging surface, and fastenings on the shoulders for securing said clamp member to the shouldered portions of said bridge member.

WILLIAM MORRILL PARKER.